(12) United States Patent
Delaplace

(10) Patent No.: US 11,874,151 B2
(45) Date of Patent: Jan. 16, 2024

(54) METHOD AND DEVICE FOR DETERMINING THE VOLUME OF LIQUID REMAINING INSIDE A FLEXIBLE LIQUID-DISPENSING POUCH

(71) Applicant: SAIPEM S.A., Montigny le Bretonneux (FR)

(72) Inventor: Thomas Delaplace, Clichy (FR)

(73) Assignee: SAIPEM S.A., Montigny le Bretonneux (FR)

( * ) Notice: Subject to any disclaimer, the term of this patent is extended or adjusted under 35 U.S.C. 154(b) by 475 days.

(21) Appl. No.: 17/273,109

(22) PCT Filed: Jun. 24, 2019

(86) PCT No.: PCT/FR2019/051543
§ 371 (c)(1),
(2) Date: Mar. 3, 2021

(87) PCT Pub. No.: WO2020/049232
PCT Pub. Date: Mar. 12, 2020

(65) Prior Publication Data
US 2021/0341328 A1 Nov. 4, 2021

(30) Foreign Application Priority Data
Sep. 7, 2018 (FR) ........................ 1858050

(51) Int. Cl.
*G01F 13/00* (2006.01)
*G01F 22/00* (2006.01)
(52) U.S. Cl.
CPC .............. *G01F 13/00* (2013.01); *G01F 22/00* (2013.01)
(58) Field of Classification Search
CPC ........... G01F 13/00; G01F 22/00; G01F 17/00
See application file for complete search history.

(56) References Cited

U.S. PATENT DOCUMENTS 7,021,495 B2 * 4/2006 De Laforcade ..... B05B 11/0059
222/105
7,770,762 B2 * 8/2010 Arghyris ........... B05B 11/00442
222/215

(Continued)

FOREIGN PATENT DOCUMENTS

| WO | 2015110413 A1 | 7/2015 |
| WO | 2016179371 A1 | 11/2016 |
| WO | 2016207359 A2 | 12/2016 |

OTHER PUBLICATIONS

International Search Report and Written Opinion from PCT Application No. PCT/FR2019/051543, dated Oct. 17, 2019.

(Continued)

*Primary Examiner* — Tung S Lau
(74) *Attorney, Agent, or Firm* — Workman Nydegger

(57) ABSTRACT

A process and a device for determining the volume of liquid remaining inside a flexible pouch provided with means for dispensing the liquid to be consumed comprises placing the pouch inside a rigid envelope filled with a known volume V1 of a first measuring liquid having an electrical conductivity C1, during the dispensing of a volume VA of liquid to be consumed, admitting inside the rigid envelope the same volume of a second measuring liquid present outside the rigid envelope and having an electrical conductivity C2 different from the electrical conductivity C1, measuring the electrical conductivity CM of the mixture of the measuring liquids present inside the rigid envelope, determining the volume VA of liquid to be consumed which has been dispensed from the measurement of the electrical conductivity C3, and calculating the volume Vr of liquid to be consumed remaining inside the pouch from the volumes Vi and VA.

16 Claims, 2 Drawing Sheets

(56) References Cited

U.S. PATENT DOCUMENTS

| | | | |
|---|---|---|---|
| 9,470,365 B1 | 10/2016 | Atkinson et al. | |
| 9,809,437 B2 * | 11/2017 | Tansey, Jr. | B67D 1/0051 |
| 2003/0029884 A1 * | 2/2003 | Rau | B65D 75/58 |
| | | | 222/92 |
| 2007/0295748 A1 * | 12/2007 | Luce | B67D 1/1247 |
| | | | 222/105 |
| 2011/0062183 A1 * | 3/2011 | Wiemer | B67D 1/0462 |
| | | | 222/105 |
| 2014/0203048 A1 * | 7/2014 | Durand | B65D 83/0055 |
| | | | 222/565 |
| 2015/0183627 A1 * | 7/2015 | Tansey, Jr. | B67D 1/0078 |
| | | | 222/190 |
| 2018/0072494 A1 | 3/2018 | Primm et al. | |

OTHER PUBLICATIONS

Search Report from corresponding FR Application No. FR1858050, dated May 14, 2019.

Fofonoff et al., "Algorithms for Computation of Fundamental Properties of Seawater", UNESCO Technical Papers in Marine Science 44, Jan. 1, 1983, 58 pages.

* cited by examiner

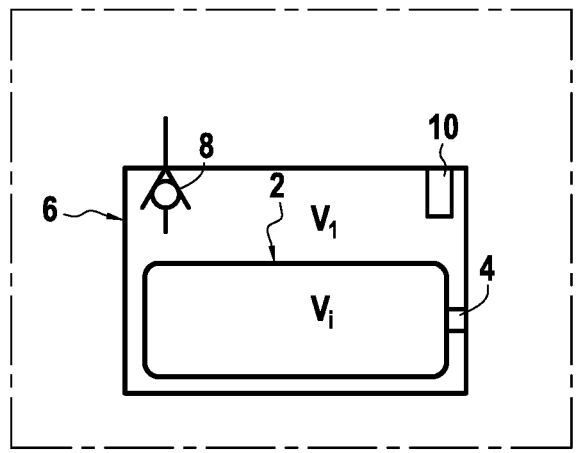 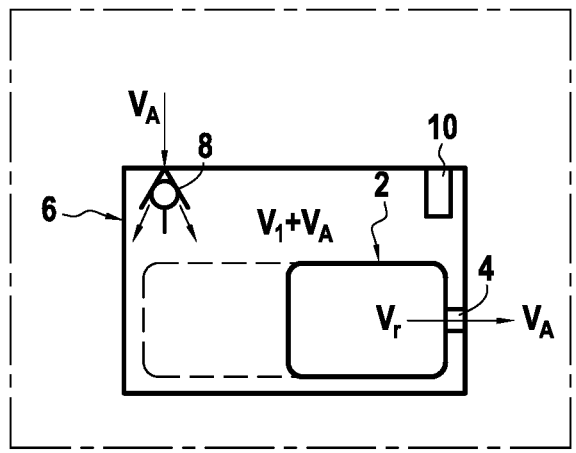
FIG.1A  FIG.1B
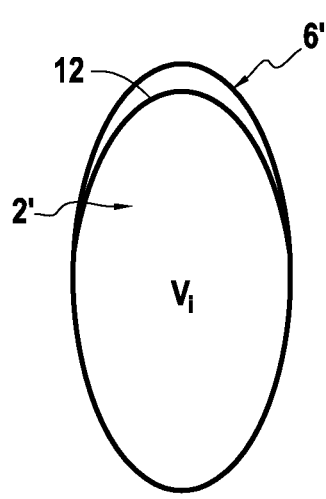 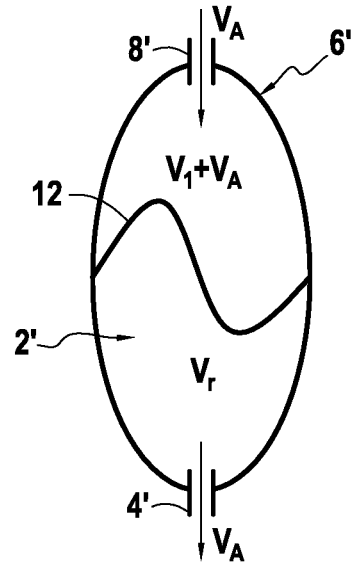
FIG.2A  FIG.2B

METHOD AND DEVICE FOR DETERMINING THE VOLUME OF LIQUID REMAINING INSIDE A FLEXIBLE LIQUID-DISPENSING POUCH

BACKGROUND OF THE INVENTION

The present invention relates to the general field of determining the volume of liquid remaining inside a flexible liquid-dispensing pouch, particularly of chemicals used in the subsea treatment of seawater, in particular in connection with the operation of hydrocarbon production wells.

In deepwater subsea production of hydrocarbons, in particular oil and gas, seawater is typically injected into wells to compensate for the loss of pressure in the reservoir related to production and to increase hydrocarbon recovery.

The seawater injected into the wells must first be treated to remove matter suspended in the water, in particular organic matter, and to desulfate the seawater, i.e., to remove the sulfate ions in order to avoid the formation of deposits when barium is present, particularly in the deposits. Indeed, sulfate ions form with barium ions or other ions present in the formation of mineral deposits that are detrimental to a satisfactory extraction of hydrocarbons.

Conventionally, seawater treatment is carried out by one or more treatment units, called sulfate removal units (SRUs), which are installed on the surface, in particular on a floating production storage and offloading (FPSO) unit. The water treatment unit integrates various modules, in particular a membrane nanofiltration system for sulfate removal and, upstream of it, a prefiltration system.

The reduction in development costs for deposits that are isolated and remote from existing production centers has however made it necessary to develop subsea seawater treatment units capable of operating underwater. Indeed, local treatment of seawater, as close as possible to the injection wells, eliminates the need for the pipe required to bring the seawater up to the treatment unit on the FPSO, the treatment unit on the FPSO itself, and the injection network from the FPSO to the wellheads.

However, the marine environment contains specific microorganisms that tend to cling and grow on certain surfaces, and more particularly to quickly foul filtration membranes, whether on surface systems or subsea stations.

In order to limit or even eliminate fouling of surface or subsea water treatment unit filtration membranes, it is known to carry out disinfection treatments on them regularly. To this end, a biocide and/or other chemicals (anti-scaling agents for example) is/are added to the water to be treated and, in this way, the chemicals reach the various equipment to be treated, in particular the filtration membranes. This increases the service life of the membranes and reduces the frequency of their replacement.

In the case of a subsea station, these chemicals can typically be stored in the form of a liquid placed in a flexible pouch, which allows it to be pressure balanced with the surrounding seawater. The flexible pouch being relatively fragile, to avoid any risk of leakage, it may be provided to place the flexible pouch inside a rigid envelope. Thus, when the chemical is consumed, the flexible pouch containing the liquid is emptied and its volume decreases. Seawater (which had surrounded the module) can then enter the rigid envelope (in the volume surrounding the flexible pouch) to compensate for the loss of volume and maintain the pressure balance between the liquid remaining in the flexible pouch and the hydrostatic pressure of the surrounding seawater. The seawater around the rigid envelope, the water inside the rigid envelope and surrounding the flexible pouch and the liquid in the flexible pouch are thus at the same pressure. Reference can be made to the publication WO 2016/179371 which describes an example embodiment of such a storage solution.

One problem related to the use of a flexible pouch for the storage and dispensing of chemicals is the monitoring and measurement of the level (i.e., volume) remaining in the pouch. Indeed, such pouches are usually used on the surface or in places where visual inspection of the remaining level is easy. However, this visual inspection is not possible in a subsea application including a rigid envelope. Another monitoring solution consists in measuring the flow rate of the liquid exiting the flexible pouch to determine the remaining level. However, if this information is lost and cannot be monitored, it is no longer possible to know the volume of liquid remaining inside the flexible pouch.

It should be noted that such subsea liquid chemical storage systems can be applied in cases other than subsea water treatment plants. For example, this type of storage can also be used to store products to be injected directly into wells, products to be added to the effluents produced (oil, gas, water) and sent to oil platforms or to the coast, such as hydrate inhibitors for example, or for pipeline commissioning applications.

SUBJECT MATTER AND SUMMARY OF THE INVENTION

The main goal of the present invention is therefore to overcome such disadvantages by proposing to determine in a simple and reliable way the volume of liquid remaining inside the flexible pouch.

In accordance with the invention, this goal is achieved by a process for determining the volume of liquid remaining $V_r$ inside a flexible pouch initially filled with a known volume $V_i$ of a liquid to be consumed and provided with means for dispensing the liquid to be consumed, the process comprising:

placing the flexible pouch inside a rigid envelope initially filled with a known volume $V_1$ of a first measuring liquid having an electrical conductivity $C_1$;
  during the dispensing of a volume $V_A$ of liquid to be consumed, admitting inside the rigid envelope the same volume $V_A$ of a second measuring liquid present outside the rigid envelope to compensate for the loss of volume due to the dispensing of the volume $V_A$ of liquid to be consumed and to maintain the pressure balance of the assembly, the second measuring liquid having an electrical conductivity $C_2$ different from the electrical conductivity $C_1$ of the first measuring liquid;
  measuring the electrical conductivity $C_M$ of the mixture of the first and second measuring liquids present inside the rigid envelope;
  determining the volume $V_A$ of liquid to be consumed that has been dispensed from the measurement of the electrical conductivity $C_M$; and
  calculating the volume $V_r$ of liquid to be consumed remaining inside the pouch from the volumes $V_i$ and $V_A$.

The process according to the invention is remarkable in that it uses simple measurements of the electrical conductivity of the mixture of the first and second measuring liquids present inside the rigid envelope to enable the volume of liquid remaining in the flexible pouch to be determined. Thus, the invention makes it possible in a simple and perennial manner to know permanently the volume of liquid remaining in the flexible pouch.

Furthermore, in the context of an application to the storage and dispensing of chemicals associated with the subsea treatment of seawater, the process according to the invention does not require any direct visual inspection of the flexible pouch to know this level.

In the case of application to the storage and dispensing of chemicals associated with the subsea treatment of seawater, preferably, the first measuring liquid is freshwater and the second measuring liquid is seawater. The choice of these liquids is particularly advantageous. Indeed, seawater is present in the direct environment of the subsea treatment unit. In addition, their respective densities can be obtained by measuring the conductivity of seawater, freshwater or a mixture of freshwater and seawater.

In this case, the volume $V_A$ of liquid to be consumed that has been dispensed is advantageously determined from the following equation:

$$V_A = V_1 \times [(\rho_M - \rho_1)/(\rho_2 - \rho_M)]$$

where: $\rho_M$ is the density of the mixture of seawater and freshwater present inside the rigid envelope; $\rho_1$ is the density of freshwater; and $\rho_2$ is the density of seawater. The two liquids (seawater and freshwater) are chemically compatible, which implies very weak chemical reactions between the two, and therefore a simplification to go from the conductivity of the mixture to its salinity and then to its density using the equation of state for seawater.

Advantageously, the density $\rho_M$ of the mixture of seawater and freshwater present inside the rigid envelope is calculated from the measurement of the electrical conductivity $C_M$ of said mixture, its temperature and its pressure.

According to another determination process, the volume $V_r$ of liquid remaining is determined from a pre-established reference curve giving the electrical conductivity $C_M$ as a function of the volume of the second measuring liquid added to the known volume $V_1$ of the first measuring liquid. This alternative determination process has the advantage of being simple to use but can be complicated by the influence of temperature and/or pressure or chemical reactions between the two liquids.

Advantageously, the mixture of the first and second measuring liquids present inside the rigid envelope is homogenized prior to measuring its electrical conductivity $C_M$. Homogenization of the mixture of the two liquids has the advantage of improving the determination of the remaining volume by measuring its conductivity.

In this case, homogenization of the mixture of the first and second measuring liquids present inside the rigid envelope can be achieved by mechanical agitation, thermal convection, vibration or recirculation.

The invention also relates to the application of the process as defined above to the subsea storage and injection of chemicals.

The invention further relates to a device for determining the volume of liquid remaining $V_r$ inside a flexible pouch placed inside a rigid envelope, comprising:
- a flexible pouch intended to be filled with a known initial volume $V_i$ of a liquid to be consumed, said flexible pouch being provided with means for dispensing the liquid to be consumed;
- a rigid envelope inside which the flexible pouch is placed and which is intended to be initially filled with a known volume $V_1$ of a first measuring liquid having an electrical conductivity $C_1$;
- means for admitting inside the rigid envelope a volume $V_A$ of a second measuring liquid present outside the rigid envelope to compensate for the loss of volume due to the dispensing of the same volume $V_A$ of liquid to be consumed and to maintain the pressure balance of the assembly, the second measuring liquid having an electrical conductivity $C_2$ different from the electrical conductivity $C_1$ of the first measuring liquid;
- an electrical conductivity sensor positioned inside the rigid envelope to measure the electrical conductivity $C_M$ of the mixture of the first and second measuring liquids present inside the rigid envelope; and
- calculation means to determine, from the measurement of the electrical conductivity $C_M$, the volume $V_A$ of liquid to be consumed that has been dispensed and, from the volumes $V_i$ and $V_A$, the volume $V_r$ of liquid to be consumed remaining inside the pouch.

Preferably, the rigid envelope comprises a check valve for the admission of the volume $V_A$ of the second measuring liquid present outside the envelope. The presence of this check valve prevents the mixture from escaping from the envelope.

According to an embodiment, the rigid envelope comprises a flexible membrane which delimits inside the rigid envelope the flexible pouch intended to be filled with the liquid to be consumed.

The device may further comprise a temperature sensor and a pressure sensor inside the rigid envelope, and a temperature sensor and a pressure sensor outside the rigid envelope in order to calculate more precisely the respective densities $\rho_1$, $\rho_2$, $\rho_M$ of the first measuring liquid, the second measuring liquid and the mixture of the first and second measuring liquids present inside the rigid envelope.

Also preferably, the device further comprises means for homogenizing the mixture of the first and second measuring liquids present inside the rigid envelope.

These means of homogenization may include a mechanical agitator, a heat source to create thermal convection, a vibration source or a mixture recirculation pump.

The means of admission inside the rigid envelope of the volume $V_A$ of a second measuring liquid may include a plurality of inlet ports distributed at different locations in the rigid envelope to facilitate homogenization of the mixture.

The device may further comprise a plurality of electrical conductivity sensors positioned at different locations inside the rigid envelope to check the homogeneity of the mixture of the first and second measuring liquids present inside the rigid envelope.

BRIEF DESCRIPTION OF THE DRAWINGS

Other features and advantages of the present invention will emerge from the description made below, with reference to the appended drawings which illustrate an example embodiment devoid of any limiting character. On the figures:

FIGS. 1A and 1B are schematic views illustrating an example implementation of the process according to the invention;

FIGS. 2A and 2B are schematic views illustrating an alternative implementation of the process according to the invention;

DETAILED DESCRIPTION OF THE INVENTION

Figure 3:
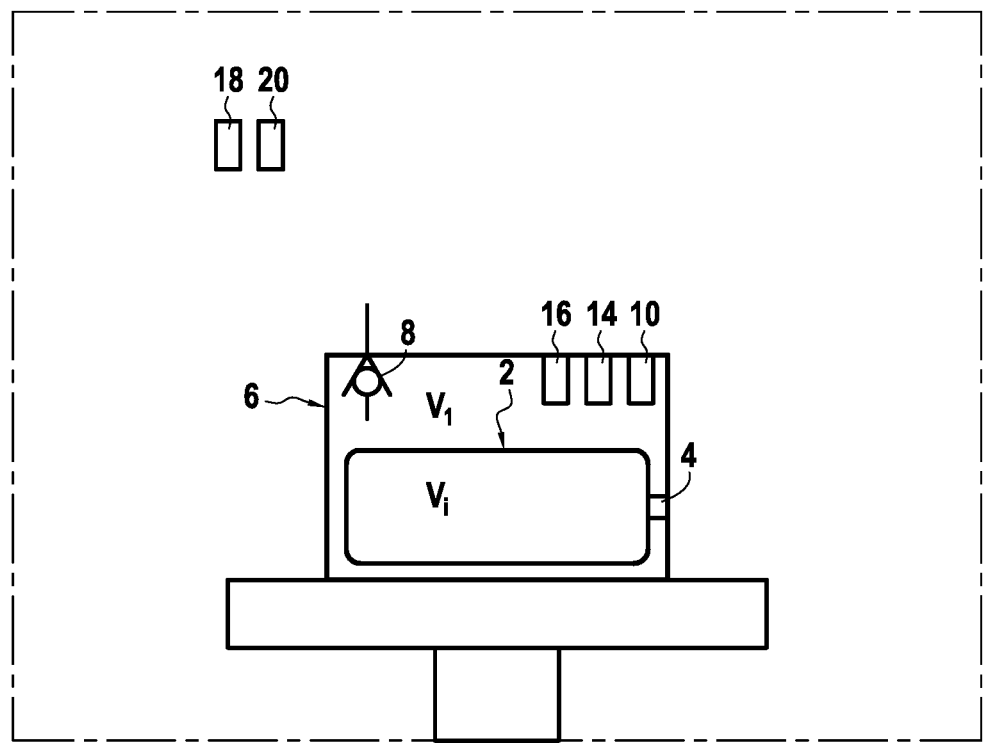
FIG. 3 is another schematic view illustrating another alternative implementation of the process according to the invention.

The invention applies to the determination of the volume of any liquid remaining $V_r$ inside a flexible pouch initially filled with a known volume $V_i$ of a liquid.

The invention has a particular—but non-limiting—application in the determination of the volume of chemicals contained in liquid form in a flexible pouch, these chemicals being intended to be mixed with wash water used to clean subsea water treatment unit filtration membranes.

FIGS. 1A and 1B schematically illustrate an example implementation of a process according to the invention for the determination of the volume of liquid remaining $V_r$ inside a flexible pouch 2 initially filled with a known volume $V_i$ of a liquid to be consumed.

The flexible pouch 2 comprises means for dispensing the liquid to be consumed, for example a biocide, an anti-scaling agent, a hydrate inhibitor, etc. As shown in FIG. 1A, the latter is initially filled with a known volume $V_1$ of a first measuring liquid having an electrical conductivity $C_1$.

Furthermore, the rigid envelope 6 comprises means for admitting a second measuring liquid present outside the rigid envelope 6, this second measuring liquid having an electrical conductivity $C_2$ different from the electrical conductivity $C_1$ of the first measuring liquid. For example, this means of admission will be in the form of a check valve 8.

The determination process according to the invention is based on the principle that, during the dispensing of a volume $V_A$ of liquid to be consumed out of the flexible pouch 2 and the rigid envelope 6, the same volume $V_A$ of a second measuring liquid present outside the rigid envelope is admitted inside the rigid envelope to compensate for the loss of pressure due to the dispensing of the volume $V_A$ of liquid to be consumed (FIG. 1B).

The volume $V_A$ of the second measuring liquid which is thus admitted inside the rigid envelope mixes with the volume $V_1$ of the first measuring liquid of electrical conductivity $C_1$. The mixture $(V_A+V_1)$ of the first and second measuring liquids inside the rigid envelope then has an electrical conductivity $C_M$ which is different from the respective electrical conductivities $C_1$, $C_2$ of the first and second measuring liquids. This electrical conductivity is measured by means of an electrical conductivity sensor 10 which is positioned inside the rigid envelope 6.

If the electrical conductivity and the initial volume $V_1$ of any mixture $(V_A+V_1)$ are known, it is possible, by measuring the electrical conductivity $C_M$ of said mixture, to determine the volume of liquid admitted inside the rigid envelope 6, and therefore the volume $V_A$ of liquid to be consumed that has been dispensed (different methods for determining this volume $V_A$ from the measurement of electrical conductivity $C_M$ will be detailed below).

It thus suffices to subtract this volume $V_A$ from the initial volume $V_i$ present inside the flexible pouch 2 to obtain the volume $V_r$ of liquid to be consumed remaining inside the pouch.

It will be noted that this process can be applied to other architectures for storing the liquid to be consumed.

FIGS. 2A and 2B schematically illustrate another example of architecture in which the rigid envelope 6' comprises a flexible membrane 12 which delimits inside the rigid envelope the flexible pocket 2' intended to receive the liquid to be consumed.

In other words, the inside of the rigid envelope 6' is here separated into two volumes by the flexible membrane 12 which deforms as the liquid is consumed. More precisely, in FIG. 1A, the flexible pouch 2' is filled with a known initial volume $V_i$ of liquid to be consumed.

When this liquid to be consumed is dispensed (by the dispensing means 4'—see FIG. 2B), the second measuring liquid present outside the rigid envelope 6' is admitted inside it (for example by means of a check valve 8') to compensate for the pressure loss due to the dispensing of the volume $V_A$ of liquid to be consumed.

Two possible methods will now be described for determining, from the measurement of the electrical conductivity $C_M$ of the mixture $(V_A+V_1)$, the volume $V_A$ of liquid to be consumed that has been dispensed, and therefore the volume $V_r$ of liquid remaining inside the flexible pouch.

A first method consists in pre-establishing a reference curve giving the electrical conductivity $C_M$ as a function of the volume $V_A$ of the second measuring liquid added to the initial volume $V_1$ of the first measuring liquid.

To this end, based on a known volume $V_1$ of liquid having a known electrical conductivity $C_1$, known volumes of liquid having a known electrical conductivity $C_2$ different from the electrical conductivity $C_1$ are gradually added and the change in the electrical conductivity $C_M$ of the mixture is followed.

Thus, it is possible to establish a reference curve valid for the second measuring liquid and for a known initial volume $V_1$ of the first measuring liquid. It should be noted that this reference curve must be established under conditions that ensure of its representativeness according to the chosen application.

When the process is implemented, the electrical conductivity $C_M$ measurements of the mixture $(V_A+V_1)$ of the first and second measuring liquids present inside the rigid envelope are compared with this reference curve to deduce the volume $V_A$ of the second measuring liquid that has entered the rigid envelope (and therefore the volume $V_A$ of liquid to be consumed that has been dispensed).

It should be noted that this method using a reference curve can be complicated by the influence of temperature and/or pressure, or chemical reactions between the first and second measuring liquids in environments where these parameters are not controlled.

A second method consists in using the measured electrical conductivity $C_M$ to calculate another parameter that simplifies the estimation of the mixture $(V_A+V_1)$ of the first and second measuring liquids present inside the rigid envelope, such as density for example.

This second method is notably particularly advantageous if the first measuring liquid is freshwater and the second measuring liquid is seawater. Indeed, these two waters are chemically compatible, which implies very weak chemical reactions between the two, and therefore a simplification to go from the electrical conductivity of the mixture to its salinity, and then to its density using the equation of state for seawater.

The density $\rho_M$ of the seawater/freshwater mixture present in the rigid envelope can then be used to determine the volume of seawater that has entered the rigid envelope by mass balance. The initial electrical conductivity $C_1$ of the freshwater, measured with a sensor or by another process, allows its density to be calculated.

It will be noted that the use of the equation of state for seawater to determine the density $\rho_M$ of the mixture from its electrical conductivity also requires knowledge of the temperature and pressure of said mixture.

To this end, as shown in FIG. 3, the device further comprises a temperature sensor 14 and a pressure sensor 16 inside the rigid envelope 6 to measure respectively the temperature $T_M$ and the pressure $P_M$ of the seawater/freshwater mixture ($V_A+V_1$) present in the rigid envelope, as well as a temperature sensor 18 and a pressure sensor 20 outside the rigid envelope to know respectively the temperature $T_2$ and the pressure $P_2$ of the seawater present outside the rigid envelope (these sensors 18, 20 can be positioned on the module, on another module or elsewhere).

These sensors allow the salinity and density corresponding to the measured conditions of pressure and temperature to be determined very precisely. Assumptions about pressure and temperature can also be made to dispense with these sensors, if for example the pressure and temperature do not vary over time or seasonally, which may be the case in a deep storage for example, but the calculation of the salinity and then the density will have a slightly greater degree of uncertainty. The remaining volume will therefore be calculated less precisely.

Figure 4:
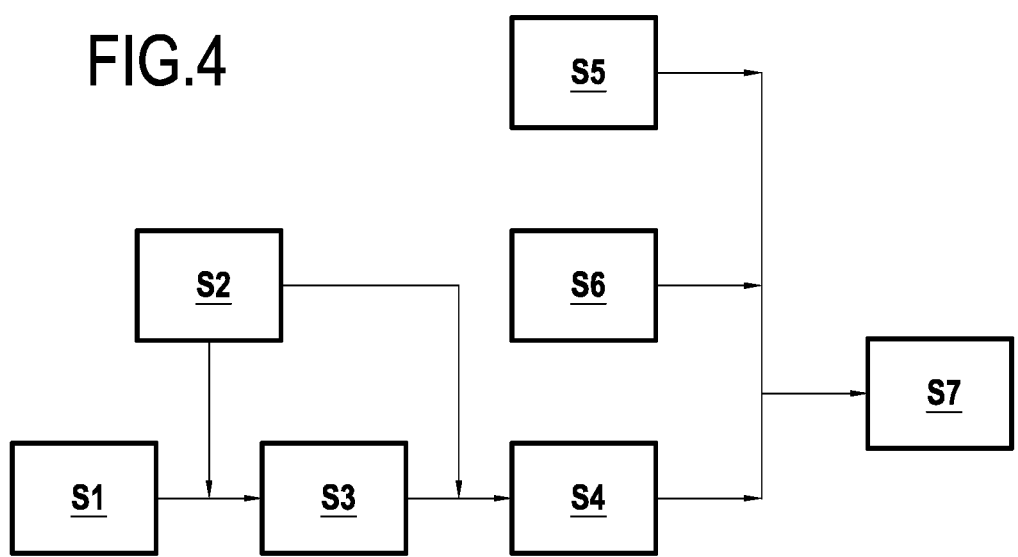
FIG. 4 is a flowchart showing different steps of the implementation of the process illustrated by FIG. 3.

FIG. 4 is a flowchart showing how these different measurements are combined to determine the density of the seawater/freshwater mixture ($V_A+V_1$) present in the rigid envelope, and then the volume $V_A$ of seawater having been admitted into the rigid envelope.

From the measurements of the electrical conductivity $C_M$ (step S1) of the temperature $T_M$ and the pressure $P_M$ (step S2) of the mixture ($V_A+V_1$), it is possible, from the equation of state for seawater, to calculate the salinity $S_M$ of the seawater/freshwater mixture present in the rigid envelope (step S3), then the density $\rho_M$ of this same mixture (step S4).

It will be noted that the equation of state for seawater allows the establishment of salinity and density curves as a function of conductivity measured at local pressure and temperature conditions. Indeed, the relationships between electrical conductivity and salinity and then between salinity and density are described by the equation of state for seawater. Algorithms based on this equation are used to determine, from the electrical conductivity, the salinity and then the density. Such algorithms are in particular described in the article titled "Algorithms for computation of fundamental properties of seawater", UNESCO Technical Papers in Marine Science 44, published in 1983.

Finally, starting from the measurements of the density pi of freshwater (step S5) and the density $\rho_2$ of seawater (step S6), the volume $V_A$ of seawater admitted in the rigid envelope (and thus the same volume $V_A$ of liquid to be consumed that was dispensed) is calculated in step S7 using the following equation:

$$V_A = V_1 \times [(\rho_M - \rho_1)/(\rho_2 - \rho_M)]$$

The volume of liquid remaining $V_r$ inside the flexible pouch is then simply obtained by subtracting the volume $V_A$ of liquid to be consumed that was dispensed from the known volume $V_i$ initially contained in the flexible pouch.

This second method for determining the volume of liquid remaining $V_r$ inside the flexible pouch is particularly advantageous for application in subsea storage and dispensing of chemicals intended to be mixed with water used to clean subsea water treatment unit filtration membranes.

To this end, during the installation of the subsea storage system, and after the flexible pouch 2 has been filled with a known volume $V_i$ of chemical, the rigid envelope 6 is first filled with freshwater (or in any case with water that is much less salty than seawater). The envelope being rigid, the initial volume $V_1$ of freshwater is known. The assembly is then placed under water at a certain temperature $T_2$ and at a certain pressure $P_2$ of the surrounding seawater.

When chemical dispensing begins, the flexible pouch 2 empties by a volume $V_A$ and the same volume $V_A$ of seawater enters the rigid envelope 6, gradually increasing the salinity of the seawater/freshwater mixture present in the rigid envelope, and thus its electrical conductivity $C_M$. This electrical conductivity is continuously measured by means of the conductivity sensor 10 and, using the measurements of the temperature $T_M$ and the pressure $P_M$ of said mixture, the density $\rho_M$ of the mixture is calculated.

This density $\rho_M$ of the mixture makes it possible to obtain at any moment the volume $V_A$ of seawater having entered inside the rigid envelope 6, and thus by extension, the volume $V_A$ of chemical consumed and the volume remaining $V_r$ inside the flexible pouch.

It will be noted that the initial volume $V_1$ of freshwater must be adapted as a function of the initial volume $V_i$ of chemical present in the flexible pouch, but also as a function of the salinities of the freshwater and seawater used. Indeed, if the initial volume of freshwater is too low for example, the variation in salinity of the mixture risks rapidly becoming too small to accurately determine the volume $V_A$ of seawater having entered the rigid envelope.

It will also be noted that the determination of the volume of liquid remaining $V_r$ inside the flexible pouch by measuring the electrical conductivity $C_M$ of the mixture present in the rigid envelope depends on the good homogeneity of said mixture. In the case of freshwater and seawater as the first and second measuring liquids, the ions will naturally migrate to homogenize the mixture but this phenomenon can take a long time.

Also, to improve the homogenization of the mixture between the first and second measuring liquids, different solutions can be provided. According to one of these solutions, the entry points of the second measuring liquid inside the rigid envelope can be multiplied and placed in different locations according to the final architecture of the assembly. According to another solution, a mechanical agitator can be provided inside the rigid envelope (for example, by using the shaft of the chemical injection pump), or a heat source to create thermal convection, or a source of vibration that affects the mixture, or a dedicated pump to feed a recirculation circuit of the mixture, etc.

In addition, several conductivity sensors could be provided inside the rigid envelope to check the homogeneity of the mixture between the first and second measuring liquids by placing them judiciously (at the top and bottom of the volume for example to compensate for the difference in density between seawater and freshwater).

The invention claimed is:

1. A process for determining the volume of liquid remaining Vr inside a flexible pouch initially filled with a known volume Vi of a liquid to be consumed and provided with means for dispensing the liquid to be consumed, the process comprising:

placing the flexible pouch inside a rigid envelope initially filled with a known volume V1 of a first measuring liquid having an electrical conductivity C1;

during the dispensing of a volume VA of liquid to be consumed, admitting inside the rigid envelope the same volume VA of a second measuring liquid present outside the rigid envelope to compensate for the loss of volume due to the dispensing of the volume VA of liquid to be consumed and to maintain the pressure balance of the assembly, the second measuring liquid having an electrical conductivity C2 different from the electrical conductivity C1 of the first measuring liquid;

measuring the electrical conductivity CM of the mixture of the first and second measuring liquids present inside the rigid envelope;

determining the volume VA of liquid to be consumed that has been dispensed from the measurement of electrical conductivity C3; and calculating the volume Vr of liquid to be consumed remaining inside the pouch from the volumes Vi and VA.

2. The process as claimed in claim 1, wherein the first measuring liquid is freshwater and the second measuring liquid is seawater.

3. The process as claimed in claim 1, wherein the volume Vr of liquid remaining is determined from a pre-established reference curve giving the electrical conductivity CM as a function of the volume of the second measuring liquid added to the known volume V1 of the first measuring liquid.

4. The process as claimed in claim 1, wherein the mixture of the first and second measuring liquids present inside the rigid envelope is homogenized prior to measuring its electrical conductivity CM.

5. Application of the process as claimed in claim 1 to the subsea storage and injection of chemicals.

6. The process as claimed in claim 2, wherein the volume VA of liquid to be consumed that has been dispensed is determined from the following equation:

$$V\_A = V\_1 \times [(\rho\_M - \rho\_1)/(\rho\_2 - \rho\_M)]$$

where: ρM is the density of the mixture of seawater and freshwater present inside the rigid envelope; ρ1 is the density of freshwater; and ρ2 is the density of seawater.

7. The process as claimed in claim 4, wherein homogenization of the mixture of the first and second measuring liquids present inside the rigid envelope is achieved by mechanical agitation, by thermal convection, by vibration or by recirculation.

8. The process as claimed in claim 6, wherein the density ρM of the mixture of seawater and freshwater present inside the rigid envelope is calculated from the measurement of the electrical conductivity CM of said mixture, its temperature and pressure.

9. A device for determining the volume of liquid remaining Vr inside a flexible pouch placed inside a rigid envelope, comprising:

a flexible pouch intended to be filled with a known initial volume Vi of a liquid to be consumed, said flexible pouch being provided with means for dispensing the liquid to be consumed;

a rigid envelope inside which the flexible pouch is placed and which is intended to be initially filled with a known volume V1 of a first measuring liquid having an electrical conductivity C1;

means for admitting inside the rigid envelope a volume VA of a second measuring liquid present outside the rigid envelope to compensate for the loss of volume due to the dispensing of the same volume VA of liquid to be consumed and to maintain the pressure balance of the assembly, the second measuring liquid having an electrical conductivity C2 different from the electrical conductivity C1 of the first measuring liquid;

an electrical conductivity sensor positioned inside the rigid envelope to measure the electrical conductivity CM of the mixture of the first and second measurement liquids present inside the rigid envelope; and calculation means to determine, from the measurement of the electrical conductivity CM, the volume VA of liquid to be consumed that has been dispensed and, from the volumes Vi and VA, the volume Vr of liquid to be consumed remaining inside the pouch.

10. The device as claimed in claim 9, wherein the rigid envelope comprises a check valve for the admission of the volume VA of the second measuring liquid present outside the envelope.

11. The device as claimed in claim 9, wherein the rigid envelope comprises a flexible membrane which delimits within the rigid envelope the flexible pouch intended to be filled with the liquid to be consumed.

12. The device as claimed in claim 9, further comprising a temperature sensor and a pressure sensor inside the rigid envelope, and a temperature sensor and a pressure sensor outside the rigid envelope in order to calculate the respective densities ρ1, ρ2, ρM of the first measuring liquid, the second measuring liquid and the mixture of the first and second measuring liquids present inside the rigid envelope.

13. The device as claimed in claim 9, further comprising means for homogenizing the mixture of the first and second measuring liquids present inside the rigid envelope.

14. The device as claimed in claim 9, wherein the means for admitting inside the rigid envelope of the volume VA of a second measuring liquid comprises a plurality of inlet ports distributed at different locations in the rigid envelope to facilitate homogenization of the mixture.

15. The device as claimed in claim 9, further comprising a plurality of electrical conductivity sensors positioned at different locations within the rigid envelope to check the homogeneity of the mixture of the first and second measuring liquids present within the rigid envelope.

16. The device as claimed in claim 13, wherein the means of homogenization comprises a mechanical agitator, a heat source for creating thermal convection, a vibration source, or a mixture recirculation pump.

* * * * *